United States Patent [19]
Cushman

[11] 3,756,067
[45] Sept. 4, 1973

[54] TEMPERATURE MEASUREMENT
[75] Inventor: Robert H. Cushman, Bethayres, Pa.
[73] Assignee: The Jade Corporation, Huntingdon Valley, Pa.
[22] Filed: Aug. 19, 1971
[21] Appl. No.: 173,057

[52] U.S. Cl. .................................. 73/15 R, 73/359
[51] Int. Cl. ........................ G01n 25/72, G01k 7/08
[58] Field of Search .................... 73/15 R, 15.4, 359

[56] References Cited
UNITED STATES PATENTS

| | | | |
|---|---|---|---|
| 2,314,753 | 3/1943 | Asimow | 73/359 X |
| 3,084,986 | 4/1963 | Schoneck | 73/359 X |
| 3,369,389 | 2/1968 | Schroeer et al. | 73/15 R |
| 3,457,770 | 7/1969 | Schroeer et al. | 73/15 R |

Primary Examiner—Myracle, Jerry W.
Assistant Examiner—Frederick Shoon
Attorney—Seidel, Gonda & Goldhammer

[57] ABSTRACT

Methods of measuring the temperature of a surface or of various surfaces of work pieces and of a surface of a heating element or member coming in contact with the work pieces. A method of real time non-destructive testing of bonds during a bonding process is also disclosed. Leads are connected directly to the heating element or a hot member coming in contact with the work piece and to the work pieces to monitor electrical potentials generated along the surfaces which give an indication of the surface temperature. A ram specially adapted for real time measurement of these surface temperatures and for real time testing of bonds formed in a mechanical thermal pulse bonding process is also disclosed.

7 Claims, 7 Drawing Figures

Patented Sept. 4, 1973 3,756,067

INVENTOR
ROBERT H. CUSHMAN

BY
Seidel, Gonda & Goldhammer

ATTORNEYS.

Patented Sept. 4, 1973

INVENTOR
ROBERT H. CUSHMAN

BY
Seidel, Gonda, & Goldhammer

ATTORNEYS

TEMPERATURE MEASUREMENT

This invention relates to a method and apparatus for the measuring of temperature. More particularly, the present invention relates to a method and apparatus for measuring the temperature of surfaces being bonded together with the use of external measuring devices such as thermocouples and thermistors.

In the prior art the most common current techniques for measuring temperatures involve the use of either thermocouples or thermistors. The techniques of using thermocouples or thermistors as temperature measuring devices have been widely used for many years. Techniques using either of these devices may be suitable for measuring the temperature of large stationary elements in a non-destructive environment. However, techniques using either of these devices suffer from a common disadvantage that an additional object, the thermocouple or thermistor, has to be placed, mounted, or otherwise located at the point where the temperature is to be measured. If the thermocouple or thermistor is made reasonably sturdy, it invariably drains sufficient thermal energy away from the measurement point to create an appreciable measurement error. This is especially true where the element or part having its temperature measured is not large with respect to the thermocouple or thermistor. If the thermocouple or thermistor is made very small in an attempt to avoid draining an appreciable amount of thermal energy from the element or part having its temperature measured, it becomes unduly fragile and short-lived. In many cases, such as bonding leads to micro-electronic devices such as beam lead devices and flip chip devices, it is impossible to construct a thermocouple or thermistor which is sufficiently small to enable the monitoring of the temperature of the lead surface being bonded. Even in larger bonding processes where a large press may be used, thermocouples and thermistors may not be suitable since their cost is substantial and they are therefore not expendable.

The present invention is particularly well adapted the measurement of surface temperatures of work pieces and of the surface of the ram in contact with the work pieces during a mechanical thermal pulse bonding process. A mechanical thermal pulse bonding process is essentially a bonding process in which metals are bonded together by the application of heat under pressure. A ram, composed of a relatively massive volume of metal chosen to have a high thermal conductivity, is heated to an accurately controlled elevated temperature. The ram is mechanically pressed against two or more work parts mounted on a support. The ram is pressed against the work parts with sufficient force to provide low values of thermal resistance between the work parts and the ram contacting surface. This allows thermal energy stored in the ram to be rapidly transferred to the work parts or work pieces by thermal conduction. The ram is then moved away from the work pieces and recharged with thermal energy for the next operation. The bonded together work pieces are then removed from the support.

The method of the present invention is particularly well suited for measuring the temperatures of the work piece surfaces and the work piece surface of the contacting ram in a mechanical thermal pulse bonding apparatus. The present invention does not require any external device or structure for sensing the temperature which could introduce temperature measurement errors and also result in damage to the external device or structure due to contact by the ram. A further advantage of the present invention is that it reduces the cost of the temperature measuring process since no external temperature sensing device or structure is required.

A relatively thin metal ribbon, sheet or other suitably shaped thin metal membrane may be mounted between the contacting surface of the ram and the upper surface of the top work piece in order to enable separate measurement of the temperature of the contacting surface of the ram and the temperature of the upper surface of the top work piece. This relatively thin metal ribbon may be 0.0005 to 0.005 inch thick. A similar relatively thin metal ribbon may be mounted between the lower surface of the bottom work piece and the support member. The use of these metal ribbons provide an additional advantage of insulating the contacting surface of the ram from contamination when the ram is being used to bond insulated wires without first removing the insulation. A further additional advantage of the use of the metal ribbon is that it facilitates the removal of insulated wires from the support member or fixture after they have been bonded without the prior removal of their insulation.

Accurate and reliable temperature measurement of lead and substrate surfaces in the process of bonding leads to semiconductor devices is invaluable. Semiconductor devices are very temperature sensitive. However, good electrically conductive bonds must be made between the leads and the semi-conductor device for proper operation. Therefore, accurate measurement of the temperature at the portion of the lead being bonded is essential to ensure that temperature is sufficiently high to form an adequate bond between the lead and the semi-conductor device and yet remain below predetermined temperature limits to prevent destruction of the semiconductor device.

The real time measurement of temperature also provides a method of real time non-destructive testing of the quality of bonds produced in the bonding process. Real time has come to mean in the electrical arts the performing of a function on operative facts as they occur. This is in contrast to performing a function on the operative facts at some time after their occurrence. The real time non-destructive testing of bonds as they are performed is a significant advantage over separate testing at a later date. The real time testing of the quality of the bonds allows a second attempt at bonding while the work pieces are at the bonding machine. This alone could result in a substantial decrease in cost of production. A further advantage of real time testing of the quality of bonds produced is that the bonding apparatus, such as the temperature of the ram, may be adjusted before a large number of defective bonds are produced. A still further and important advantage is that the physical phenomena available during the bonding process enable the most sensitive and meaningful testing of the bond quality. After the bond is formed, this data and method of testing is unavailable. Therefore, this method of real time testing produces a significant advantage.

For the purpose of illustrating the invention, there are shown in the drawings forms which are presently preferred; it being understood, however, that this invention is not limited to the precise arrangements and instrumentalities shown.

Figure 1:
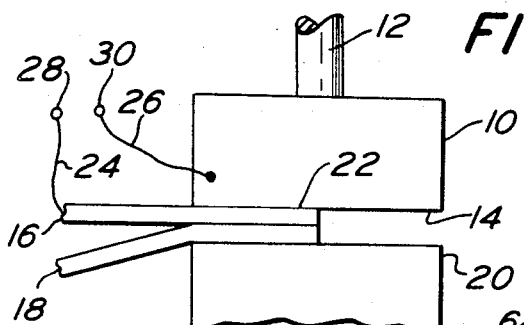
FIGS. 1 and 2 are elevation views of apparatus used in practicing the method of the present invention.

Referring now to the drawings in detail, there is shown in FIG. 1 a ram 10 having a stem 12 through which mechanical motion may be imparted to the ram 10. The ram 10 may be made from any suitable material having a relatively high thermal conductivity, a relatively large heat capacity per unit volume and a relatively high compressive strength at elevated temperatures. Examples of some suitable materials for ram 10 are copper tungsten alloys, silver tungsten alloys, tungsten, molybdenum and beryllium copper alloys. An additional highly desirable characteristic of ram 10 is to have work piece contacting surface 14 free from insulating oxidation which would impede heat flow to work pieces 16 and 18. Work piece 18 is mounted on a support member 20, which may be another ram.

Figure 5:
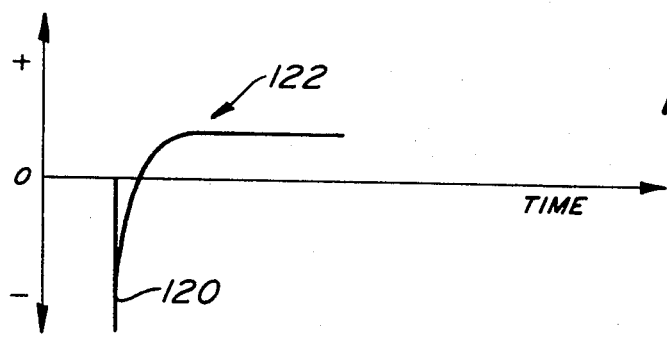
FIG. 5 is a drawing of an electrical waveshape generated in practicing the present invention.

In the process of bonding work piece 16 to work piece 18, ram 10 is initially in a raised position. Ram 10 is heated to a predetermined temperature which may be 1200° F. Work pieces 16 and 18 are mounted in juxtaposition on support member 20. The heated ram 10 is then mechanically forced against work pieces 16 and 18 as shown in FIG. 1. The pressure of ram 10 upon work pieces 16 and 18 provides good thermal contact or high thermal conductivity between ram 10 and work piece 16 and between work pieces 16 and 18. This good thermal contact allows the heat stored in ram 10 to be used in forming the bond. However, in many instances as described above, it is important that accurate temperature measurements be made along surface 22 between ram 10 and work piece 16. By connecting lead 24 to work piece 16 and lead 26 to the ram 10, an electrical potential generated along surface 22 may be monitored across terminals 28 and 30. At the instant that ram 10 contacts work piece 16, that is before the temperature of work piece 16 is raised to the temperature of ram 10, a relatively large spike potential 120, as shown in FIG. 5, is generated across terminals 28 and 30. The magnitude of this spike potential 120 will be proportional to the difference in temperature between the ram 10 and work piece 16. Electrical potential between terminals 28 and 30 is generated by electron charge distributions in work piece 16 and ram 10 along surface 22. This electrical potential between terminals 28 and 30 may be used as an indication of the temperature along interface of surface 22. During the time that ram 10 contacts work piece 16, a unique electrical wave form will be generated along interface of surface 22. One typical wave form is shown at 122 in FIG. 5. This electrical wave form is between terminals 28 and 30 and may be compared with a standard wave form in order to provide a method of real time non-destructive testing of the quality of the bond formed between work pieces 16 and 18.

Figure 2:
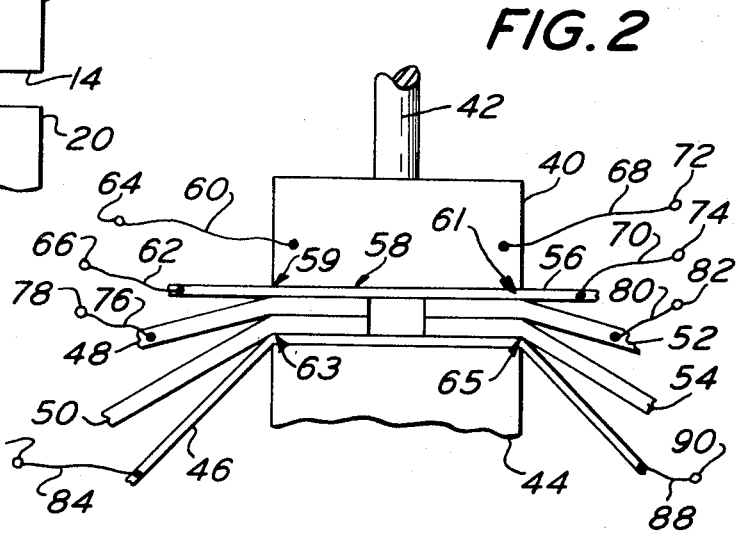

Referring now to FIG. 2, there is shown an arrangement in which temperatures of various surfaces of a plurality of work pieces may be simultaneously measured or monitored for a real time non-destructive testing. There is shown a ram 40 having a stem 42. Ram 40 is composed of a suitable material as described above. Support 44 may be made of any suitable fairly rigid material. A relatively thin metallic ribbon 46, which may be a sheet or other suitably shaped metallic membrane, is mounted on support member 44. Metallic ribbon 46 may be composed of any suitable metal other than the metal composing work pieces 50 or 54. In a preferred arrangement, metal ribbon 46 would be a stainless steel ribbon having a thickness of 0.001 inch.

Work pieces 48 and 50 are mounted in juxtaposition on metal ribbon 46 in order to be bonded together. Similarly work pieces 52 and 54 are mounted in juxtaposition on metal ribbon 46 in order to be bonded together. A metal ribbon 56 is mounted on work pieces 48 and 52 or on ram 58. Metal ribbon 56 may be composed of any suitable metal which is different from the composition of ram 40 and work pieces 48 and 52. As noted with respect to metal ribbon 46, metal ribbon 56 may preferably be a stainless steel ribbon having a thickness of 0.001 inch. It may be assumed for the purposes of example that work pieces 48, 50, 52 and 54 are copper ribbon conductors.

In order to measure the temperature of surface 58 of ram 40, lead 60 may be connected to ram 40 and lead 62 connected to metal ribbon 56. The electrical potential, particularly the magnitude of spike potential 120 shown in FIG. 5, measured across terminals 64 and 66 may then be used to give an indication of the temperature of the ram surface 58 where it last contacts metal ribbon 56 at point 59. This electrical potential will also be porportional to the heat flow through the ribbon and ram surfaces. This heat flow may be calculated by knowing the thickness and composition of metal ribbon 56. Alternatively, lead 68 may be connected to ram 40 and lead 70 to metal ribbon 56 with the electrical potential monitored across terminals 72 and 74 to indicate the temperature at 61. In order to measure the potential of the upper surface of work piece 48 in contact with metal ribbon 46, lead 76 may be connected to work piece 48 and the electrical potential monitored between terminals 78 and 66. Similarly, the temperature on the upper surface of work piece 52 in contact with metal ribbon 56 may be monitored by connecting a lead 80 to work piece 52 and monitoring the electrical potential between terminals 82 and 74. If work pieces 48 and 50 are composed of the same material, the temperature of the bottom surface of work piece 50 at point 63 in contact with metal ribbon 56 may be measured or monitored by connecting a lead 84 to metal ribbon 46 and monitoring the electrical potential between terminals 78 and 86. Similarly, the temperature of the bottom surface of work piece 54 in contact with metal ribbon 46 at point 65 may be monitored by connecting a lead 88 to metal ribbon 46 and monitoring the electrical potential between terminals 82 and 90. It is therefore seen that the temperature may be accurately measured at a number of different surfaces for each of a plurality of work piece pairs being bonded thereby enabling a heat flow analysis or the creation of temperature profiles of rams and work piece surfaces for use in setting up a new bonding operation if it is so needed or desired. The use of metal ribbons 46 and 56 has an additional advantage in that the composition of the ribbons 46 and 56 may be selected in order to generate an electrical potential by the thermal electric effect of a desired magnitude. That is, with any particular work piece composition, a metal ribbon composition can be chosen which will give the desired electrical potential across the output leads in a particular temperature range. A further advantage of the use of the metal ribbons is achieved where the ram is used to bond insulated wires or conductors. This further advantage is that the ram contacting surface 50 may be kept free of contaminants. In addition, the bonded insulated wires and any residues from the insulation may be more readily removed from support 44. Once the wires are removed from support 44, removal of the metal ribbon is easily achieved due to the ability to flex the insulated wires.

Although temperature measurements as above described may be made on base metal alloy rams such as rams 10 and 40 above described, the rams may within a few hours develop oxides on surfaces 14 and 58, respectively, which are very poor thermal and electrical conductors. The oxides formed are porous and much less dense than the base metal alloy of which the ram is composed. Although this oxide layer may be relatively thin, its thermal conductivity can be several orders of magnitude less than that of the base metal alloy. The poor electrical conductivity of the oxide layer also makes the measurement of temperature between the ram and the work pieces impractical because of the substantial increase in resistance.

Figure 3:
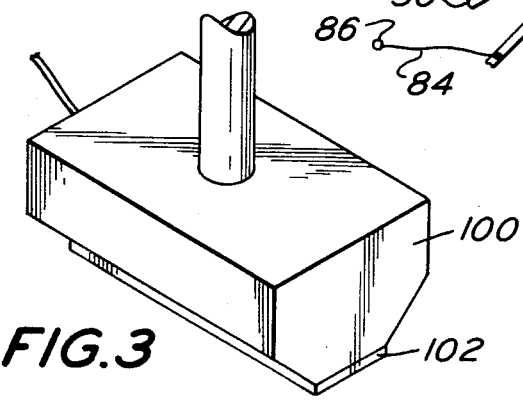
FIG. 3 is a drawing of an improved ram which may be used in practicing the present invention.
Figure 3A:
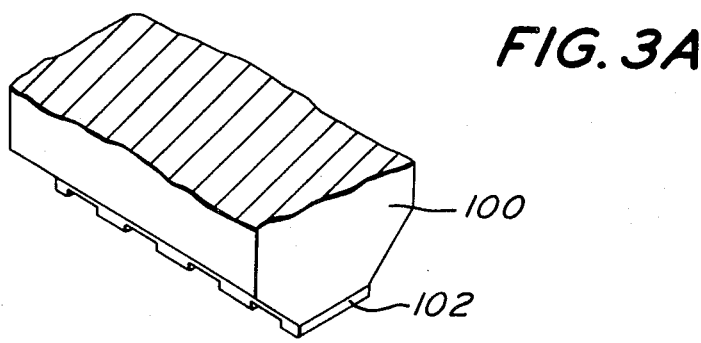
FIG. 3A is a drawing of a variation of the improved ram of FIG. 3.

Referring now to FIG. 3, there is shown a ram 100 provided with a coating 102 on its work piece contacting surface. The coating 102 may be chaped as shown in FIG. 3A to provide specific workpiece contacts and temperature measuring points. Coating 102 may be any metal which develops an electrically conductive oxide in order to avoid the problems encountered due to the base metal alloy developing a relatively non-conductive oxide. Coating 102 may for example be the relatively economical precious metal palladium. It is noted that most of the precious metal oxides do not have sufficient thermal conductivity to be suitable for coating 102. However, the use of pure palladium may require the use of a stainless steel sheet similar to metal ribbon 56 because of its low tensile strength at elevated temperatures. For example, annealed palladium at 600°C. has a tensile strength of only 13,000 psi. Other suitable materials, which have a greater tensile strength, for coating 102 are a platinum-irridium alloy having between 15 to 30 percent irridium and a platinum-rhodium alloy having from 15 to 40 percent rhodium. Both of these alloys have relatively high tensile strength at elevated temperatures and therefore would not require the use of a steel sheet in order to protect coating 102.

Figure 4:
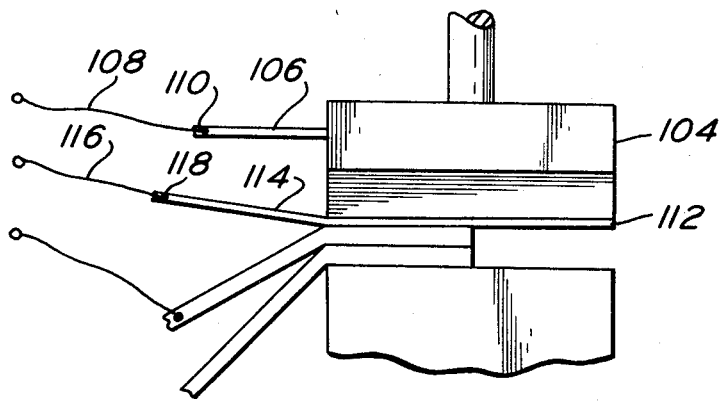
FIG. 4 is another embodiment of a ram used in practicing the present invention.

Referring now to FIG. 4, there is shown a ram 104 having a unitarily formed lead 106. Lead 106 is unitarily formed out of the same base material as ram 104 in order to avoid the creation of extraneous thermal electric voltages by connecting lead 108 to ram 104 at an elevated temperature. Edn 110 of lead 106 will be at approximately room temperature. Ram 104 is provided with a coating 112 having the same properties as coating 102 of FIG. 3. Coating 112 is formed to project beyond ram 104 to form a lead 114. An external lead 116 may be connected to end 118 of lead 114 which is at approximately room temperature. Connection of external lead 116 to end 118 which is at approximately room temperature is also for the purpose of avoiding the generation of any extraneous thermal electric voltages.

Figure 6:
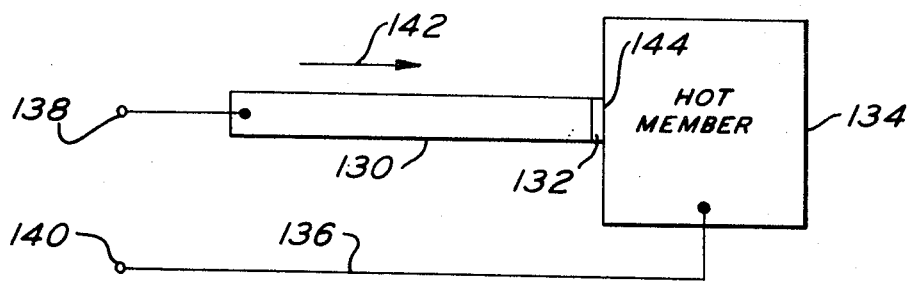
FIG. 6 is a drawing of apparatus used in practicing a variation of the method of temperature measurement of the present invention.

Referring now to FIG. 6, there is shown a probe 130 which may be used in practicing a variation of the method of temperature measurement of the present invention. Probe 130 may be made of any suitable alloy material. However, probe 130 may preferably be provided with a tip 132 composed of a thin layer of metallic material which does not form an oxide at the temperature of hot member 134 or else forms an oxide which is electrically and thermally conductive. Examples of suitable materials for tip 132 are palladium, platinum irridium alloys and platinum rhodium alloys. A lead 136, which may be another probe, is connected to electrically conductive hot member 134 at a point remote from the point at which it is desired to measure the temperature. An indication of the temperature at point 144 is obtained by measuring the magnitude of the spike potential appearing across terminals 138 and 140 as probe 130 is rapidly brought into contact with hot member 134 as shown by arrow 142.

It will be apparent to those skilled in the art that the method of temperature measurement described herein may be used for measuring temperatures in various processes and in various types of test and research equipment. It is also apparent that various changes and modifications may be made in the method, or different devices used to produce the same function in the method. For example, with reference to FIG. 6, as noted above, the lead 136 may be a second probe. Additionally, both the probe 142 and the probe which would be connected to terminal 140 may be simultaneously and rapidly brought into contact with hot member 134.

In view of the above, the present invention may be embodied in other specific forms without departing from the spirit or essential attributes thereof and, accordingly, reference should be made to the appended claims, rather than to the foregoing specification as indicating the scope of the invention.

It is claimed:

1. A method of measuring temperature between a first member and a hot member when said first member and said hot member are rapidly brought into contact with each other, comprising the steps of:
   connecting a lead to said first member;
   connecting a lead to said second member; and
   measuring the instantaneous transient electrical potential generated between said leads when said hot member and said first member are rapidly brought into contact with each other.

2. A method of measuring the temperature of a surface of a work piece contacted by a heated ram in a thermal bonding process, comprising the steps of:
   connecting a lead to said heated ram;
   connecting a lead to said work piece; and
   measuring an electrical potential generated between said leads when said heated ram is brought into contact with said work piece.

3. A method of real time non-destructive testing of a bond formed between two work pieces in a thermal bonding process wherein a heated ram contacts at least one of said two work pieces mounted on a support member, comprising the steps of:
   connecting a first lead to said heated ram;

connecting a second lead to said one of said work pieces contacted by said heated ram;

monitoring an electrical wave form appearing between said first and second leads when said heated ram contacts said one of said work pieces; and comparing said electrical wave form to a standard wave form.

4. A method of measuring surface temperatures in a thermal bonding process wherein a first and a second work piece are mounted between a support member and a heated ram, comprising the steps of:

mounting a metal ribbon between said heated ram and said first work piece;

connecting a first lead to said heated ram;

connecting a second lead to said metal ribbon; and measuring an electrical potential generated between said first and said second leads when said ram contacts said metal ribbon as an indication of the temperature of the surface of the ram contacting said metal ribbon.

5. A method of measuring surface temperatures as recited in claim 4 including the steps of:

connecting a third lead to said first work piece; and measuring an electrical potential generated between said second and said third leads when said ram contacts said metal ribbon as an indication of the temperature of the surface of said first work piece in contact with said metal ribbon.

6. A method of measuring surface temperatures as recited in claim 5 including the steps of:

mounting a second metal ribbon between said second work piece and said support member;

connecting a fourth lead to said second metal ribbon; and measuring an electrical potential generated between said third and said fourth leads when said ram contacts said metal ribbon as an indication of the temperature of a surface of said second work piece in contact with said second metal ribbon.

7. A method of measuring temperature of a hot member of electrically conductive material, comprising the steps of:

connecting a first lead to said hot member at a point remote from the point at which the temperature is to be measured;

contacting said hot member at the desired temperature measurement point with a probe; and measuring the electrical spike potential generated between said probe and said first lead as an indication of the temperature of said hot member.

* * * * *